United States Patent [19]

Wilson

[11] 4,149,985

[45] Apr. 17, 1979

[54] PROCESS FOR THE PREPARATION OF A GEL RESISTANT GLYCOL COMPOSITION CONTAINING AN ALKALI METAL BORATE AND SILICATE

[75] Inventor: David A. Wilson, Richwood, Tex.

[73] Assignee: The Dow Chemical Company, Midland, Mich.

[21] Appl. No.: 912,642

[22] Filed: Jun. 5, 1978

[51] Int. Cl.$^2$ ............................................... C09K 5/00
[52] U.S. Cl. ..................................... 252/74; 252/75
[58] Field of Search .................................. 252/74, 75

[56] References Cited

U.S. PATENT DOCUMENTS

| | | | |
|---|---|---|---|
| 2,961,291 | 11/1960 | Pickett et al. | 252/74 X |
| 3,282,846 | 11/1966 | Scott | 252/75 |
| 3,340,001 | 9/1967 | Thornhill | 252/75 X |
| 3,362,910 | 1/1968 | Ordelt et al. | 252/75 |

*Primary Examiner*—Harris A. Pitlick
*Attorney, Agent, or Firm*—B. G. Colley

[57] ABSTRACT

Glycol composition useful as antifreeze compositions are prepared containing borates and silicates together with other corrosion inhibitors. The silicates are added to the glycol compositions after the other additives have been added and after the composition has been adjusted to a pH range of 9.5–10.5 in order to give maximum gellation resistance.

3 Claims, No Drawings

PROCESS FOR THE PREPARATION OF A GEL RESISTANT GLYCOL COMPOSITION CONTAINING AN ALKALI METAL BORATE AND SILICATE

BACKGROUND OF THE INVENTION

The present invention is a process for preparing a gellation resistant and corrosion resistant glycol composition.

Antifreeze compositions containing glycols and various corrosion inhibitors are well known in the prior art as is illustrated by U.S. Pat. No. 3,282,846 dated Nov. 1, 1966, and U.S. Pat. No. 3,362,910 dated Jan. 9, 1968. The use of the relatively inexpensive and effective borax and silicates in glycol formulations is well illustrated by these patents. It is conventional in this art to make a glycol concentrate which is then sold to end users for use in automotive radiators after dilution with water.

In the past, it has been found that glycol concentrates prepared using the same or substantially the same formulations set forth in the above patents had a tendency to develop irreversible silicate gels upon standing for a period of time in a warehouse or store. The end user, when he attempted to pour the glycol concentrate into his automotive radiator found that the concentrate had developed "slugs" or gels which either did not pour readily or which tumbled out in discrete masses along with the liquid. The present invention was developed to eliminate this gel formation.

SUMMARY OF THE INVENTION

It now has been discovered that in the preparation of antifreeze compositions containing silicate and borax (sodium tetraborate), the silicate must be added to the alkaline glycol-borax concentrate to avoid the formation of silicate gels upon storage.

The present invention is a process for the preparation of a gellation resistant and corrosion resistant glycol composition comprising 85 to 98 percent by weight of an alkylene glycol, a corrosion inhibiting amount of an alkali metal borate, and a corrosion inhibiting amount of an alkali metal silicate which comprises
 (A) adding said amount of borate to said alkylene glycol containing water and other inhibitors necessary for corrosion resistance, which results in a neutral, acidic, or slightly alkaline solution,
 (B) raising the pH of the solution to a range from 9.5 to 10.5 by adding a basic inorganic compound, and
 (C) adding an amount of said silicate which will give corrosion protection and also gellation resistance.

DETAILED DESCRIPTION OF THE INVENTION

The glycols which can be used in the present invention are ethylene glycol, diethylene glycol, propylene glycol and mixtures thereof.

The following are examples of corrosion inhibitors and additives which can be used in the present invention.

Alkali metal silicates such as sodium metasilicate, potassium metasilicate, lithium metasilicate, and the like.

Alkali metal borates such as sodium tetraborate, potassium tetraborate, sodium metaborate, and potassium metaborate.

Alkali metal mercaptobenzotriazoles, and alkali metal tolyltriazoles.

Alkali metal nitrates such as sodium nitrate, potassium nitrate, and alkali metal nitrites such as potassium and sodium nitrite.

Alkali metal phosphates such as sodium phosphate and potassium phosphate, and various dyes.

In the process of this invention, one or more of the above glycols are mixed with one of the above borates and sufficient amounts of inhibitors necessary for corrosion protection. The pH of the solution is then adjusted to 9.5 to 10.5 by adding a basic inorganic compound such as an alkali metal hydroxide, carbonate, or phosphate. Finally, one of the above silicates is added to produce a gellation resistant glycol composition.

For the purposes of this invention, a gella-tion resistant glycol composition is one that will have a shelf life at room temperature (25° C.) of a minimum of two years.

The above corrosion inhibitors when used in a corrosion inhibiting amount is well known in the prior art. Of course, this amount will vary for each inhibitor but in general the amounts used for the silicates and borates are:

0.03 to 0.3 percent by weight based on the total solution weight of silicates and 0.6 to 2.0 percent by weight of borates. Preferably, these ranges are 0.03 to 0.20 percent and 0.6 to 1.6 percent respectively.

As can be seen by the controls and examples hereinafter set forth, the order of addition of the silicates and borates and the pH is a critical feature of this invention.

In the process of this invention, it has been found that when the borate levels are at the higher end of the desired range (0.6 to 2.0 percent by weight), the amount of silicate that can be added after the pH of the solution is raised to a pH of 9.5 to 10.5 must be in the lower end of the desired range of silicate level (0.03 to 0.3 percent by weight). It is not possible to set forth exactly the amount of silicate to be used in each instance due to the complicating influence of the other corrosion inhibitors such as the aforementioned triazoles, nitrates, nitrites, and phosphates. However, one can by a simple accelerated aging test determine the amount of silicate which when added at a pH of 9.5 to 10.5, will give the required gellation resistance.

The accelerated aging test in the examples and controls that follow was performed by placing a sample of the glycol composition in an oven controlled at 150° F. (66° C.) and measuring the number of hours or days before the composition begins to gel. By comparing the room temperature (25° C.) aging of the same samples, it has been found that one day at 150° F. is approximately equal to one month at room temperature.

The invention is further illustrated but not limited by the following examples:

EXAMPLE 1.

Sodium metaborate $Na_2B_4O_7.5H_2O$ (13.0 g) was added to 960 g of ethylene glycol and stirred until dissolution was complete. A 33⅓% aqueous $NaNO_3$ solution (6.0 g) was added and stirred until well dispersed, followed by 2 gms of a 50% aqueous solution of sodium tolyltriazole. The pH of the solution was then adjusted with aqueous caustic to 9.45 and 10 gms of a 10% aqueous solution of sodium metasilicate pentahydrate ($Na_2SiO_3.5H_2O$) was added with stirring during a 2 minute addition time. The final pH of the antifreeze solution was 11.0 and it contained 1.3% sodium metaborate pentahydrate and 0.1% sodium metasilicate.pentahydrate. The solution prepared in this manner was found to have a shelf life as determined by the above accelerated aging test of about 35 days which is equivalent to about 35 months.

EXAMPLE 2.

The procedure described in Example 1 was repeated except that the initial pH of the solution was adjusted to 10.25. After the silicate solution was added, the pH was 11.02. The antifreeze solution prepared in this manner has a shelf life of about 45 days as determined by the accelerated aging test and this is equivalent to about 45 months.

Control A

An ethylene glycol solution containing 1.3% $Na_2B_4O_7.5H_2O$ and 0.2% $Na_2SiO_3.5H_2O$ at pH 9.7 was acidified at pH 7.15 with a $Na_2B_4O_7.5H_2O$ ethylene glycol solution (total $Na_2B_4O_7.5H_2O$ concentration of 1.6%), and then adjusted to a final pH of 10.5 with aqueous NaOH. The product was placed in a 150° F. oven and developed a gel in approximately 20 hours.

Control B

An ethylene glycol solution containing 1.6% $Na_2B_4O_7.5H_2O$ and 0.2% $Na_2SiO_3.5H_2O$ at pH 10.5, prepared with no pH fluctuations, was found to gel in approximately 30 hours at 150° F.

These controls show that once the silicate solution has been added, the borate should not be post added because post addition of the borate promotes silicate gel formation.

Control C

Following the procedure set forth in Example 1, the pH of the glycol solution before the addition of the silicate was adjusted to 8.45. The stability by the accelerated aging test was about 5 days which is equal to about 5 months at room temperature.

Control D

Following the procedure set forth in Example 1, the pH of the glycol solution before the addition of the silicate was adjusted to 9.02. The stability by the accelerated ageing test was 10 days which is equal to about 10 months at room temperature.

The stability results of the examples and controls C and D are summarized in Table I.

TABLE I

|  | pH at time of addition of silicate | Final Solution pH | Stability at 150° F. (days) |
|---|---|---|---|
| Control C | 8.45 | 10.84 | 5 |
| Control D | 9.02 | 10.89 | 10 |
| Example 1 | 9.45 | 10.98 | 35 |
| Example 2 | 10.25 | 11.02 | 45 |

This table shows that the pH of the solution when the silicate is added is important to obtain long shelf life even though the final glycol solutions all have a pH of about 11.

I claim:

1. A process for the preparation of a gellation resistant and corrosion resistant aqueous glycol composition comprising 85 to 98 percent by weight of an alkylene glycol, a corrosion inhibiting amount of an alkali metal borate, and a corrosion inhibiting amount of an alkali metal silicate, which comprises
   (A) adding said amount of said borate to said alkylene glycol containing water and other inhibitors necessary for corrosion resistance which results in a neutral, acidic, or slightly alkaline solution,
   (B) raising the pH of the solution to the range from 9.5 to 10.5 by adding a basic inorganic compound, and
   (C) adding an amount of said silicate which will give corrosion protection and also gellation resistance.

2. The process as set forth in claim 1, wherein the alkylene glycol is ethylene glycol.

3. The process as set forth in claim 1, wherein the amount of alkali metal borate used is in the range of 0.6 to 1.6 percent and the amount of alkali metal silicate used in the range 0.03 to 0.20 percent.

* * * * *